March 4, 1930.  J. F. SCHYLANDER  1,749,512
SOLDERING DEVICE
Filed Nov. 30, 1925   2 Sheets-Sheet 1
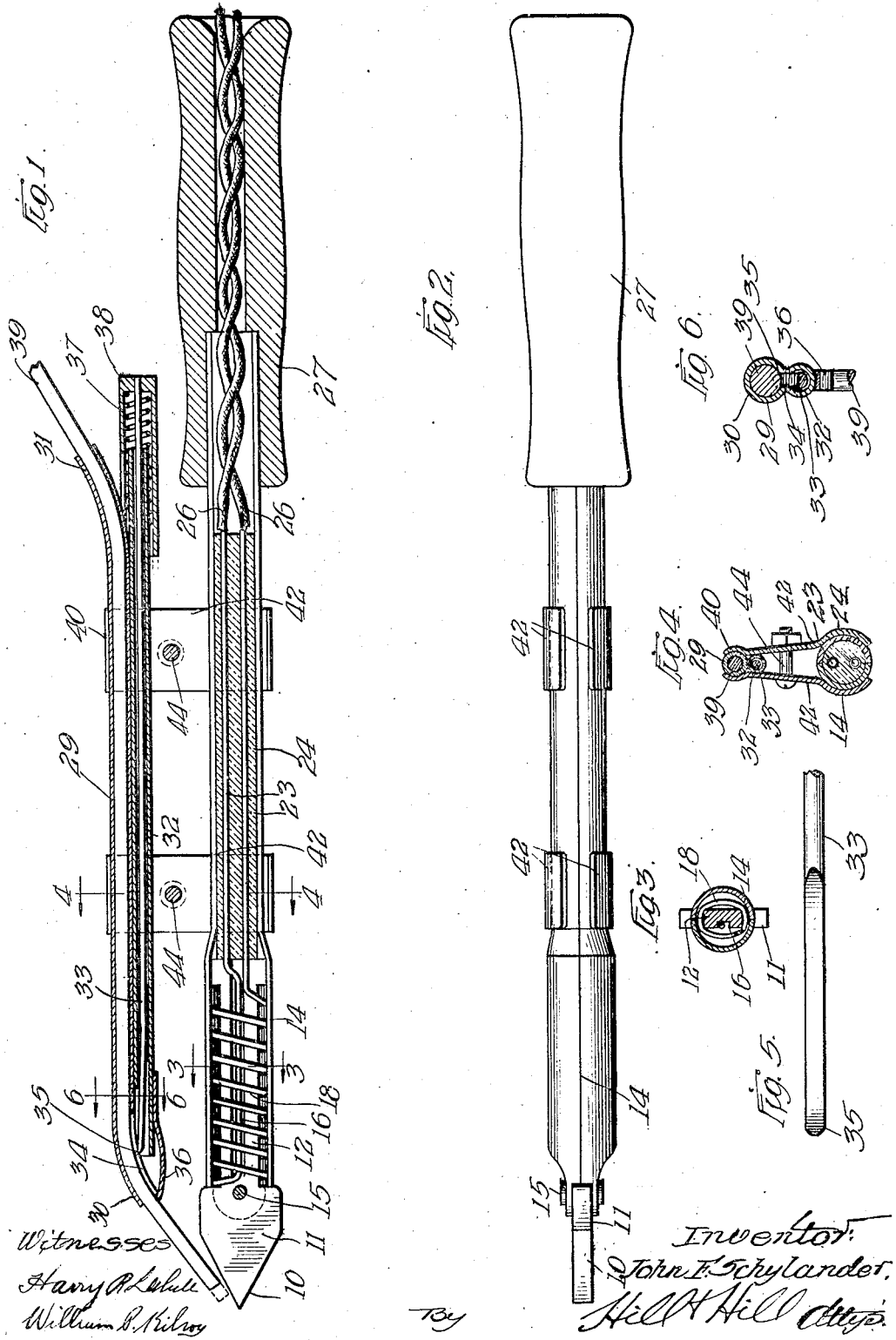

March 4, 1930.　　　J. F. SCHYLANDER　　　1,749,512
SOLDERING DEVICE
Filed Nov. 30, 1925　　　2 Sheets-Sheet 2
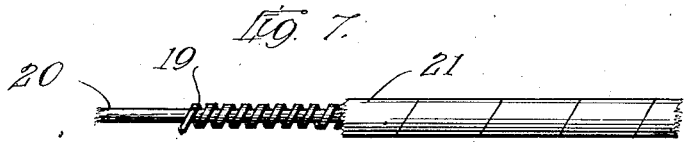
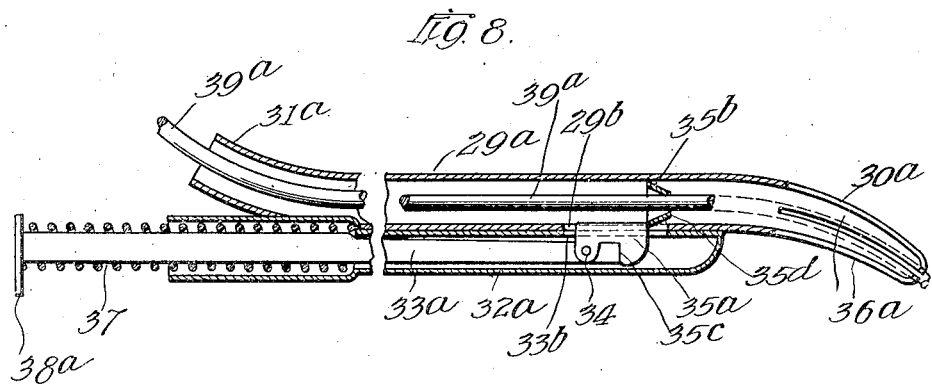
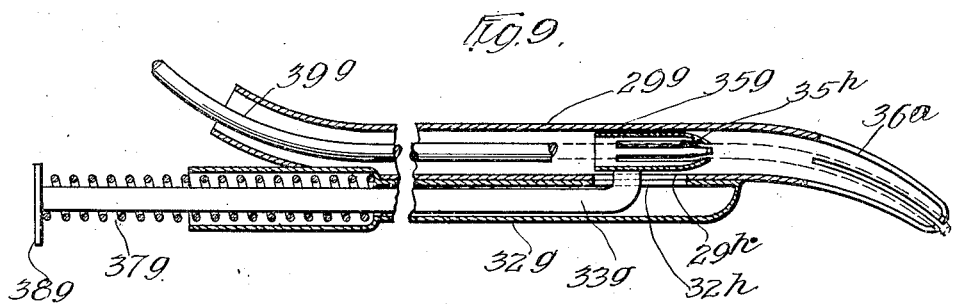
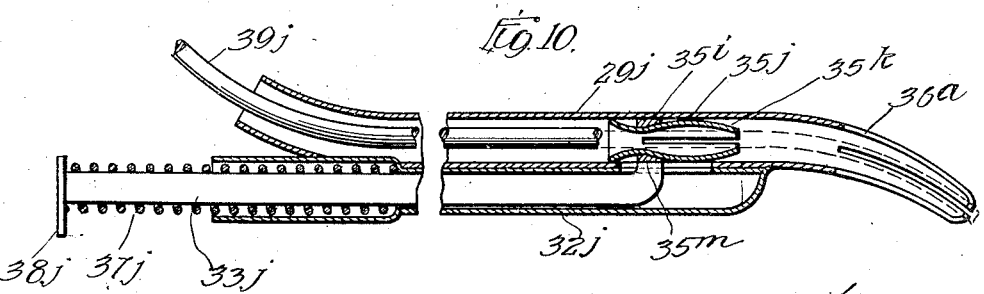

Patented Mar. 4, 1930

1,749,512

UNITED STATES PATENT OFFICE

JOHN F. SCHYLANDER, OF CHICAGO, ILLINOIS

SOLDERING DEVICE

Application filed November 30, 1925. Serial No. 72,289.

My invention relates to soldering devices and particularly to apparatus for feeding solder to the heated tips of soldering irons or the equivalent.

The invention has among its other objects the production of devices of the kind described, which are convenient, compact, durable and satisfactory for use wherever found applicable.

A particular object of the invention is to provide improved solder-feeding apparatus which can be readily applied to soldering irons now in existence.

Another particular object of the invention is to provide improved means for feeding predetermined quantities of solder or predetermined quantities of solder and flux to the heated tips of soldering irons or the equivalent.

One form of the invention is embodied in apparatus for feeding solder, or solder and flux, to the heated tip of a soldering iron upon which the apparatus is mounted by means that permit the apparatus to be quickly and easily secured to the iron. The apparatus preferably comprises a tube, or the equivalent, through which solder in the form of a wire or ribbon may be advanced, the forward end of the tube being arranged to guide the solder to the heated tip. Slidably journaled in means disposed adjacent the tube is a plunger, which is normally held in a retracted position by a spring, the plunger being adapted to be manually advanced to engage the solder and to advance it so that a predetermined quantity thereof is delivered to the heated tip of the soldering iron. This and other forms of the invention are described in detail in the following description.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a longitudinal section taken through a soldering device embodying my invention;

Fig. 2 is a bottom plan view of the device shown in Fig. 1;

Fig. 3 is a section taken on line 3—3 of Fig. 1;

Fig. 4 is a section taken on line 4—4 of Fig. 1;

Fig. 5 is an enlarged fragmentary view of one end of a plunger forming part of the device shown in Fig. 1;

Fig. 6 is a section taken on line 6—6 of Fig. 1;

Fig. 7 is a fragmentary view of a resistance element for heating the tip of the improved device shown in Fig. 1;

Fig. 8 is a fragmentary longitudinal section taken through a device embodying another form of the invention;

Fig. 9 is a fragmentary longitudinal section taken through a device forming another form of the invention; and Fig. 10 is a fragmentary longitudinal section taken through a device embodying still another form of the invention.

Referring for the present to Figs. 1 to 7, inclusive, wherein I have illustrated a soldering device embodying a preferred form of the invention, the reference character 10 designates a tip resembling the tips usually provided in soldering irons or the equivalent, the tip 10 preferably comprising a head portion 11 and a shank portion 12. The shank portion 12 projects into a tubular shank 14 and is secured thereto by a rivet 15. Wound around the shank portion 12 and seated in a groove 16 formed therein is a resistance unit 18 comprising suitable resistance wire 19 wound around a strand of asbestos 20, or the equivalent, the wire 19 being preferably covered with asbestos ribbon, as indicated at 21 (Fig. 7). The two ends of the wire 19 extend through apertures 23 formed in a tube 24 disposed within the tubular shank 14, the tube 24 being preferably formed from refractory material, such as porcelain. The resistance unit 18 may be connected to any suitable source of electrical energy (not shown) by conductors 26 which extend through a handle 27 secured to one end of the tubular shank 14.

Extending longitudinally of the tubular shank 14 and spaced therefrom is a tube 29 which is preferably curved at its forward end, as indicated at 30, the other end of the tube being preferably curved in the opposite direction as indicated at 31. The purpose of this construction will presently appear.

Secured to the under side of the tube 29 and extending parallel thereto is a tube 32 having a plunger 33 slidably journaled therein, the forward end of the plunger 33 being adapted to enter a slot 34 formed in the curved end 30 of the tube 29. It will be noted that the forward end of the plunger 33 is flattened to provide a relatively sharp point 35. A compression spring 37 wound around the rear end of the tube 32 normally holds the plunger 33 in its retracted position, the spring 37 having one of its ends resting against a cap member 38 secured to the plunger 33. The construction is such that the plunger 33 and cap 38 may be moved to the left (Fig. 1) against the action of the spring 37 until the cap engages the tube 32 which serves as a stop.

The tube 29 is made circular in cross-section to accommodate solder 39 provided in the form of a wire having a circular cross-section. If desired, the solder 39 may be provided with a core 40 of flux. As best shown in Fig. 1, the curved end 30 of the tube 29 is adapted to guide the solder 39 to the soldering point on the tip 10. A leaf spring 36 rigidly secured to the tube 32 has its free end aligned with the slot 34 and is adapted to engage the solder 39.

Any suitable means may be provided for securing the tubes 29 and 32 to or relative to the tubular shank 14. However, I preferably provide one or more pairs of clips 42 shaped to conform to the tube 29 and the tubular shank 14, the clips being adapted to be clamped upon the tube 29 and the tubular shank 14 by bolts 44, or equivalents, for the purpose. Obviously, the tubes 29 and 32 and the apparatus carried thereby may be quickly and easily mounted upon soldering irons now in existence, as the clips 42 may be made to conform to the shanks of said soldering irons.

The operation of the improved device is substantially as follows: A length of solder 39 is inserted in the tube 29 in such manner that it projects from the curved end 30. The resistance element 14 is then operatively connected to any suitable source of electrical energy (not shown) and after the tip has become heated, the cap member 38 is displaced against the action of the spring 37 to cause the point 35 of the plunger 33 to engage the solder 39 and advance it a predetermined distance toward the tip 10. The tip 10 fuses the solder brought in contact with it during this feeding operation and the operator may apply the fused solder to the work. Obviously, predetermined quantities of solder may be fed to the tip 10 as desired, the plunger 33 being retracted by the spring 37 after each feeding operation. The spring 36 prevents the solder from being retracted with the plunger.

In Fig. 8 I have shown another form of the invention embodied in apparatus adapted to be mounted upon a soldering iron and adapted to supply solder to the heated tip thereof. Any suitable means may be provided for securing the apparatus shown in Fig. 8 to the soldering iron but I preferably use the aforementioned clips 42, or equivalents, for the purpose. The apparatus shown in Fig. 8 comprises a tube $29^a$ having curved ends $30^a$ and $31^a$, the curved end $30^a$ being adapted to guide solder to the heated tip of the soldering iron to which the apparatus is applied. Secured to the under side of the tube $29^a$ is a tube $32^a$ in which a plunger $33^a$ is slidably journaled, the plunger $33^a$ being held in a retracted position by a spring $37^a$ having one of its ends resting against a head $38^a$ formed upon the plunger $33^a$. Pivoted to the forward end of the plunger $33^a$ by a pin $34^a$ is a member $35^a$ having a hollow conical portion $35^b$ disposed in the tube 29, the member $35^a$ being arranged to project through slots $29^b$ and $33^b$ formed in the tubes $29^a$ and $33^a$, respectively. The member $35^a$ is preferably formed with a shoulder $35^c$ engageable with the forward end of the plunger $33^a$. The conical member $35^b$ is preferably provided with a relatively sharp annular edge $35^b$ engageable with solder $39^a$, which may be inserted in the tube $29^a$. The plunger $33^a$ may be displaced against the action of the spring $37^a$ a distance which is limited by the length of the slots $29^b$ and $33^b$. This displacement of the plunger $33^a$ causes the sharp edge $35^d$ to engage and bite into the under surface of the solder $39^a$ so that the solder is advanced substantially the same distance that the plunger $33^a$ is advanced. When the spring $37^a$ is permitted to retract the plunger $33^a$, the member $35^a$ falls into a position wherein the shoulder $35^c$ rests against the forward end of the plunger $33^a$ and the sharp edge $35^d$ glides over the surface of the solder $39^a$. Obviously, a soldering iron which is provided with the apparatus shown in Fig. 8 may be operated in substantially the same manner as the soldering device illustrated in Figs. 1 to 7, inclusive.

Fig. 9 illustrates another form of the invention embodied in apparatus comprising tubes $29^g$ and $32^g$, the tube $32^g$ being secured to the under side of the tube $29^g$ and being adapted to slidably journal a plunger $33^g$ provided with a head $38^g$. Wound around the plunger 33ᵍ is a spring 37ᵍ adapted to hold the plunger in a retracted position, the construction being such that the plunger may be advanced against the action of the spring a distance which is limited by the lengths of slots 29ʰ and 32ʰ formed in the tubes 29ᵍ and 32ᵍ, respectively. The forward end of the plunger 32ᵍ extends through the slots 29ʰ and 32ʰ and carries a tubular member 35ᵍ provided with forwardly extending resilient fingers 35ʰ. As illustrated, the fingers 35ʰ are provided with inturned ends adapted to engage a length of solder 39ᵍ inserted in the tube 29ᵍ. The fingers 35ʰ are adapted to bite into the solder 39ᵍ when the plunger 33ᵍ is displaced against the action of the spring 37ᵍ. This permits a predetermined length of solder to be fed to a soldering iron to which the tubes 29ᵍ and 32ᵍ have been secured. When the spring 37ᵍ is permitted to retract the plunger 33ᵍ, the fingers 35ʰ yield and glide over the surface of the solder.

In Fig. 10 I have illustrated still another form of the invention embodied in apparatus comprising tubes 29ʲ and 32ʲ, the tube 32ʲ being secured to the under side of the tube 29ʲ and being adapted to slidably journal a plunger 33ʲ, which is normally held in a retracted position by a spring 37ʲ interposed between the tube 32ʲ and a head 38ʲ formed upon the plunger. The forward end of the plunger 33ʲ projects through suitable slots formed in the tubes 29ʲ and 32ʲ and carries a tubular member 35ʲ, the tubular member 35ʲ being disposed within the tube 29ʲ and preferably comprising resilient fingers 35ᵏ adapted to engage a length of solder 39ʲ inserted in the tube 29ʲ. The member 35ʲ is preferably formed with a relatively narrow portion 35ˡ intermediate its ends, which narrow portion 35ˡ is loosely seated in an aperture 35ᵐ formed in the forward end of the plunger 33ʲ. As shown, the member 35ʲ is curved intermediate its ends in such manner that when the plunger 33ʲ is advanced against the action of the spring 37ʲ the wall of the aperture 35ᵐ binds against the fingers 35ᵏ and causes their free ends to bite into the solder 39ʲ, whereupon the solder is advanced a distance substantially equal to the distance which the plunger is advanced. When the spring 37ʲ is permitted to retract the plunger 33ʲ, the wall of the aperture 35ᵐ is disengaged from the fingers 35ᵏ and the fingers spring back into positions which permit them to glide over the surface of the solder 39ʲ. Obviously, the apparatus shown in Fig. 10 can be applied to a soldering iron in substantially the same manner as that in which the feeding apparatus shown in Figs. 1 to 6, inclusive, is attached to a soldering iron, and it may be made to function in substantially the same manner.

In those forms of the invention illustrated in Figs. 8 to 10, inclusive, the ends of the tubes 29ᵃ, 29ᵍ and 29ʲ adapted to guide the solder to the heated tips of the soldering irons are slotted to provide spring fingers 36ᵃ which will prevent the solder from being retracted into the tubes after each feeding operation.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. The combination with means for guiding solder to the tip of a soldering iron, and a slidably journaled plunger engageable with the solder for advancing the solder in said guiding means, of means for quickly mounting said guiding means and said plunger upon the soldering iron.

2. The combination with a soldering iron, of apparatus for feeding solder to the tip thereof, said apparatus comprising means spaced from the soldering iron for guiding the solder to the tip, and a slidably journaled plunger for advancing the solder through the guiding means.

3. The combination with a soldering iron, of means for feeding solder to the tip, said means comprising a tube spaced from said iron and having a curved end for guiding the solder to said tip, and a slidably journaled plunger having an end adapted to enter said tube, said end being engageable with the solder for advancing it through said tube.

4. The combination with a soldering iron, of means for feeding solder to the tip, said means comprising a tube spaced from said iron and having a curved end for guiding the solder to said tip, a slidably journaled plunger having an end adapted to enter said tube, said end being engageable with the solder for advancing it through said tube, and means for retracting the plunger.

5. In combination with a soldering iron, a conduit for solder disposed parallel to said iron and terminating adjacent the tip thereof, a retractable plunger for feeding solid solder from said conduit to said tip, and a member on said plunger adapted to engage solid solder within said conduit on its forward movement and to slide past said solder on retraction.

6. In combination with a soldering iron, a conduit for solder disposed parallel to said iron and terminating adjacent the tip thereof, means associated with said conduit for preventing the retraction of solder, a retractable plunger for feeding solid solder from said conduit to said tip, and a member on said plunger adapted to engage solid solder within said conduit on its forward movement and to slide past said solder on retraction.

7. In combination with a soldering iron, a conduit for solder disposed parallel to said iron and terminating adjacent the tip thereof, a retractable plunger for feeding solid solder from said conduit to said tip, and means carried by said plunger and disposed in said conduit for advancing said solder, said means comprising a plurality of jaws adapted to grip said solder on the forward stroke of said plunger and to slide past said solder on the retractive movement thereof.

8. In combination with a soldering iron, a conduit for solder disposed parallel to said iron and terminating adjacent the tip thereof, means associated with said conduit for preventing the retraction of solder, a retractable plunger for feeding solid solder from said conduit to said tip, and means carried by said plunger and disposed in said conduit for advancing said solder, said means comprising a plurality of jaws adapted to grip said solder on the forward stroke of said plunger and to slide past said solder on the retractive movement thereof.

In testimony whereof, I have hereunto signed my name.

JOHN F. SCHYLANDER.